J. J. KERR.
MANUFACTURE OF PROPELLERS.
APPLICATION FILED JULY 8, 1916.

1,345,859.

Patented July 6, 1920.

Inventor:
John J. Kerr
By Bacon & Milans
Atty's

UNITED STATES PATENT OFFICE.

JOHN JAMES KERR, OF LINCOLN, ENGLAND.

MANUFACTURE OF PROPELLERS.

1,345,859.  Specification of Letters Patent.  Patented July 6, 1920.

Application filed July 8, 1916. Serial No. 108,227.

*To all whom it may concern:*

Be it known that I, JOHN JAMES KERR, a subject of the King of Great Britain, and a resident of 5 Tempest street, Lincoln, England, have invented new and useful Improvements in the Manufacture of Propellers, of which the following is the specification.

This invention consists of a machine for the automatic shaping of the special shape required for the blades of propellers particularly propellers for aircraft, whereby the blades of a propeller are caused to rotate upon their longitudinal axis between fixed centers at each end, while their center is strongly supported within a cylinder or sleeve which revolves within a strongly fixed bearing, the center of this bearing being in perfect alinement with the fixed centers at the extremities of the blades.

Near and parallel to this bearing is a similar cylinder or sleeve revolving in a similar manner which contains a metallic model perfectly finished to the shape desired for aircraft blades, and supported at its extremities in perfect alinement with fixed centers.

The two central driving cylinders are so geared with each other that they revolve in equal times in the same direction, or by a suitable change in the gearing, they can be made to revolve in equal times in opposite directions to each other.

This invention can be better understood by referring to the attached drawing:—

Figure 1:
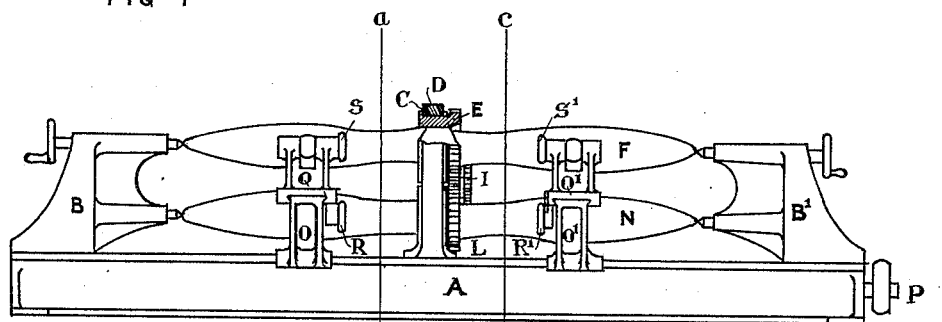
Figure 2:
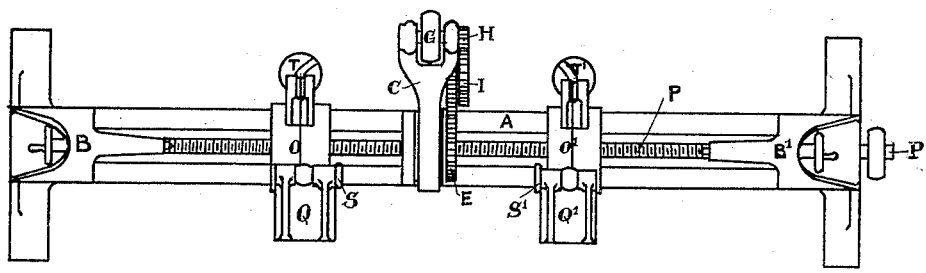
Figure 3:
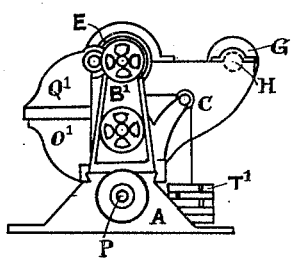
Figure 4:
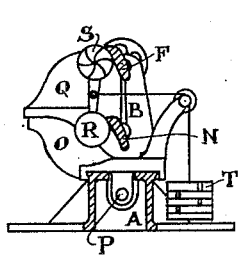
Figure 5:
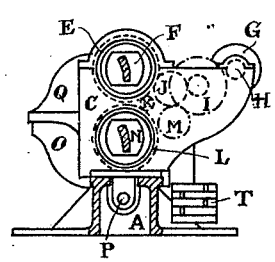

Figure 1 shows a front elevation.
Fig. 2 shows a plan.
Fig. 3 shows an end elevation.
Fig. 4 shows a section on line $a, b$.
Fig. 5 shows a section on line $c, d$.

Letter A denotes a bed or gantry upon which the various parts of the machine are carried, B and $B^1$ denote the heads carrying the centers of bearings for the extremities of the blades and their metal model.

C is the central bearing and driving head, the upper part of which in Fig. 1, at D, is shown in section showing the cylinder E, containing, sustaining and driving the propeller F, in its central part, which cylinder has a toothed gear ring at one end.

G is the belt driven pulley with the pinion H fixed on the same shaft. I is a spur wheel gearing with H, and having a small pinion forming an integral part of it.

This pinion of I gears into an idle wheel J, and by this means conveys motion to the cylinder E, in the same direction. Pinion K is an idle pinion connecting cylinder E with the cylinder L which contains, sustains and drives in its central part, the model N, and which cylinder also has a toothed gear ring at one end, and thus the two cylinders revolve in the same direction in equal times.

By removing the idle pinion K, and substituting for it the idle wheel M upon a different center the said idle wheel gearing with J and L, the cylinder L will be caused to revolve in the opposite direction to cylinder E, but in equal times, and by this means a right handed or a left handed propeller blade can be produced from the same model.

O and $O^1$ are saddles sliding on the gantry A, which saddles are caused to approach to or recede from the center by a rotating screw P which screw is rotated by a pulley, one half of said screws having a right hand thread and the other half having a left hand thread. The saddles O and $O^1$ each contain a sliding head Q and $Q^1$ which slides are transversely arranged to the gantry A. The heads Q and $Q^1$ each contain a roller R and $R^1$ and also the cutter blocks S and $S^1$. By means of the weights T and $T^1$ the rollers are kept in constant contact with the model N, while it is rotating, and as the cutters are of equal diameters with rollers, and the blades rotate in the same time, an exact copy of the model is produced.

What I do claim as my invention and desire to secure by Letters Patent is:—

1. In a machine for the purpose set forth, the combination of means for supporting a propeller and a model at their ends in close parallel relation, means for rotatably supporting and holding the propeller and model centrally of the ends thereof against relative lateral movement, said means including a relatively narrow support located centrally of the ends of the propeller and model, annular bearings on said central support extending through the same, rings rotatably mounted in said bearings, and in which the propeller and model are held, driving means for the propeller and model connected therewith near said central support, and trimming means operatively associated with the model and controlled thereby for shaping the propeller to accord with the shape of the model, said trimming means being supported for adjustment longitudinally of and at right angles to the propeller and model.

2. In a machine for the purpose set forth, the combination of a frame including a bed, vertically extending supports at opposite ends of the bed, means associated with said supports for supporting a propeller and model at their ends in close parallel relation in the same vertical plane, means for rotatably supporting and holding the propeller and model centrally of their ends against relative lateral movement, said means comprising a relatively narrow vertical support on the bed centrally of the ends thereof, annular bearings on said central support extending therethrough, rings supported for rotation in the bearings and in which the propeller and model are held, said rings being provided with gear teeth, driving gearing mounted upon the central support at the upper part thereof and to one side of the propeller and model, said driving means meshing with the gear teeth on said rings, and a pair of trimming devices located at one side of the propeller and model and slidably supported on the bed for adjustment longitudinally and laterally of the propeller and model between the ends thereof and said central support, said trimming devices being operatively associated with the model to be controlled thereby to shape the propeller in accordance with the model.

JOHN JAMES KERR.

Witnesses:
MARJORY G. ROLLIN,
THOS. H. COOK.